US008032390B2

(12) United States Patent
Waguet

(10) Patent No.: US 8,032,390 B2
(45) Date of Patent: *Oct. 4, 2011

(54) CONTEXT INFORMATION MANAGEMENT

(75) Inventor: Cyrille Waguet, St-Leon-Rot (DE)

(73) Assignee: SAP AG, Walldorf (DE)

( * ) Notice: Subject to any disclaimer, the term of this patent is extended or adjusted under 35 U.S.C. 154(b) by 1314 days.

This patent is subject to a terminal disclaimer.

(21) Appl. No.: 11/648,428

(22) Filed: Dec. 28, 2006

(65) Prior Publication Data

US 2008/0162208 A1    Jul. 3, 2008

(51) Int. Cl.
*G06Q 10/00* (2006.01)
(52) U.S. Cl. ............... 705/1.1; 719/318; 707/705
(58) Field of Classification Search ............ 719/318
See application file for complete search history.

(56) References Cited

U.S. PATENT DOCUMENTS

| | | | | |
|---|---|---|---|---|
| 5,953,389 | A * | 9/1999 | Pruett et al. ............ | 379/9 |
| 6,272,333 | B1 * | 8/2001 | Smith ............... | 455/418 |
| 6,571,285 | B1 * | 5/2003 | Groath et al. ............ | 709/223 |
| 7,610,575 | B2 * | 10/2009 | Sproule ............ | 717/103 |
| 2005/0097396 | A1 * | 5/2005 | Wood ............... | 714/25 |

* cited by examiner

*Primary Examiner* — Matthew Brooks
*Assistant Examiner* — Sangeeta Bahl
(74) *Attorney, Agent, or Firm* — Mintz, Levin, Cohn, Ferris, Glovsky & Popeo, P.C.

(57) ABSTRACT

Methods and apparatus, including computer program products, to manage context information of events. Data characterizing an event is received, a data structure is generated, and an event resolution procedure that is to be initiated is determined (e.g., based on the data characterizing the event and one or more associated business processes being identified). The event may be defined in a business process (e.g., a computer-implemented business), for example, as a business activity. The relevance of the event to one or more business processes may be computed (e.g., to determine if the event relates to a business process such that action for a business process may be required) such that relevant business processes are identified. The data structure may be generated in response to receipt of the data (e.g., after the identification of the event or at about the same time).

20 Claims, 4 Drawing Sheets

CONTEXT INFORMATION MANAGEMENT

BACKGROUND

The present disclosure relates to data processing by digital computer, and more particularly to management of context information for events.

In general, a computing system for an enterprise may receive numerous events from different sources. The events may be user-generated or machine-generated (e.g., a computing system may generate a message in response to a change in status of the computing system). The computing system may have defined procedures for determining how to respond to the events. Responding to many events, from the different sources, in an efficient manner may be challenging and may result in poor performance. For example, a queue of events may be resolved slowly as resolution of each event may require a lot of communication to gather information necessary to resolve the event.

SUMMARY

The present disclosure provides methods and apparatus, including computer program products, that implement techniques for management of context information for events.

In one aspect, data characterizing an event is received, a relevance of the event is computed, the data is associated with a data structure, the data structure is generated, and an event resolution procedure is determined. The event may be defined in a business process (e.g., a computer-implemented business process), for example, as a business activity. The relevance of the event to one or more business processes may be computed (e.g., to determine if the event relates to a business process such that action for a business process may be required). The data structure may be generated in response to receipt of the data.

In another aspect, data characterizing an event is received, business processes related to the event are identified, a data structure is generated in response to receipt of the data, and an event resolution procedure that is to be initiated is determined based on the data characterizing the event and the one or more business processes. The data structure may include information about the event derived from the received data, information to assist retrieving further information related to the event, or both. The event resolution procedure may consume data from the data structure to perform the event resolution procedure.

The subject matter may be implemented as, for example, computer program products, computer-implemented methods, and systems.

Variations may include one or more of the following features.

An already-composed data structure may be updated to indicate occurrence of the event, instead of generating a data structure for each event.

A data structure may include information about the event and information to assist retrieving further information related to the event.

A template (e.g., a designtime version of a data structure) that corresponds to the event may be determined (e.g., a type of template from a selection of templates). Generating a data structure from a template may include generating the data structure from a template that corresponds to an event.

The event may be a stateful event. The event may be associated with the data structure (e.g., such that the event may communicate with the data structure), and a notification may be received (e.g., based on the associating the event with the data structure; e.g., the notification may be generated by the event).

A notification may be generated as a result of rules or, for example, an alert may be generated as a result of processing of some information available in the data structure and not only through rules within "backbone" business processes.

Determining the event resolution procedure may include determining the event resolution procedure based on content of the data structure, on a procedure associated with the data structure, or both. The procedure may be a rule (e.g., a business rule), a sequence of operations, and the like.

An application may be invoked to resolve the event, where data characterizing the data structure (e.g., a name of the data structure or the data structure itself) is sent to the application.

Determining an event resolution procedure may include interpreting a computer-implemented business process to determine an activity to perform.

Upon completion of the event resolution, a notification of completion may be received and the data structure may be updated to reflect the resolution of the event. As events may be stateful, business processes may depend on this completion before performing other activities. A notification of completion may be generated and sent to a stateful event (e.g., generated by a context management system for a data structure). Also, notifications may be generated in response to events that may cause a state change of a stateful event.

An event resolution procedure may include starting a computer-implemented business process or continuing activities related to a computer-implemented business process (e.g., a business process corresponding to the event might not have commenced).

The subject matter disclosed herein may be implemented to realize one or more of the following advantages. Data structures that include information about events may be generated to assist in event resolution and those data structures may be generated in response to business events. Rather than forcing an event resolution management system to adapt to changing needs of applications that assist in event resolution (e.g., generating special adapters for communicating with different system), cross-platform event resolution may be achieved with the use of a single format of a data structure such by having applications configured to the format of the data structure. Similarly a single format may be used to define an event resolution procedure that can be understood by various systems (e.g., applications). Different standards for communicating event information in the form of a data structure may be used. Events that result in generation of a data structure may already be filtered by complex event processing such that only business-related events are processed. Data structures may be enriched with context information about an event at designtime, instantiation, or during runtime. Multiple systems may be required to resolve an event and various systems having different platforms may tacitly communicate (and tacitly synchronize data) by updating a same data structure representing information about an event. The system may provide event-driven context management (e.g., by generating data structures in response to events and using those data structures to invoke event resolution procedures), which may improve reactivity to events (e.g., events may be resolved in less time). Information from various data structures for events may be aggregated at a management system to infer information that may assist in resolving events or providing performance measurements. The event resolution may be used to extend existing computer-implemented business processes (or other workflow processes) or may be used as event resolution of an entire business process.

Details of one or more implementations are set forth in the accompanying drawings and in the description below. Further features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

In general, FIGS. 1-4 relate to management of context information for events. As used in reference to features of FIGS. 1-4, clients are clients in the sense of being client programs (e.g., client applications; e.g., a client program having a client/server relationship with a server program); although, the term client, as used herein, may refer to a client system (e.g., a computer system where a client program resides and the computer system having a client/server relationship with a server computer system). In any case, a client program may be referred to as a tool (e.g., a computer program), and, that tool may be used to access services offered by a server program. Also, a client program may be made of one or more computer programs (e.g., a client program may be an amalgamation of multiple programs). Similarly, the term server may be used in the sense of being a server program; although, the term server, as used herein, may refer to a server system (e.g., a computer system where a server program resides). A computer system may be a client system or server system by having a client or system program, respectively, residing on the computer system, where, from the view of the relationship of a client and server program, a client/server relationship may exist. A computer system need not be only a client system or a server system. For example, for one set of client and server programs, a computer system may be a client system by having a client program; yet, the computer system may be a server system by having a server program from another set of client and server programs. Although some of the figures depict a single server, a client/server system need not be limited to one server. Also, a client/server system may have periods during which clients and servers are not connected to each other. Similarly, a client need not be connected to a server to be considered a client (e.g., a client may be developed for use in obtaining services without a specific server being considered).

Figure 1:
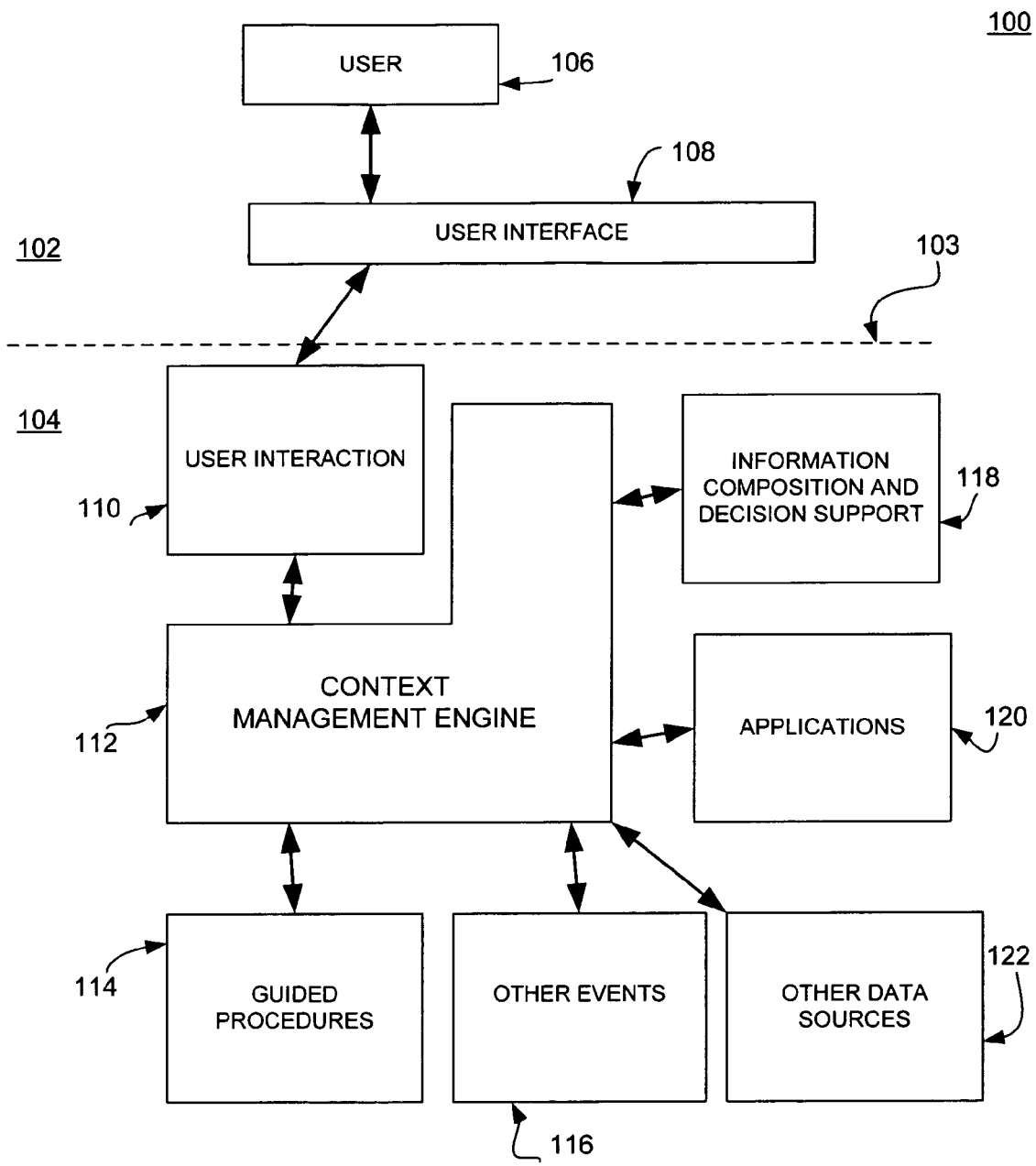
FIG. 1 is a diagram of a client/server system including a context management engine.

FIG. 1 is a diagram of a client/server system 100 including a context management engine 112. In general, the context management engine 112 manages context information for events. To manage the information, the context management engine 112 may generate a data structure that corresponds to the event, where the data structure includes information about the event and may further include information about how to retrieve further information related to an event. For example, in response to receiving data characterizing a user-generated event from a user interface 108 of a client system 102, a user interaction module 110 of a server system 104 may forward data related to the event to the context management engine 112. The context management engine 112 may generate or update a data structure to reflect the event and include in the data structure information about the event (e.g., a user identification of a user 106 that has generated the event, a description of the event, and the like). Then, to resolve the event (e.g., consume the event), the context management engine may forward a link to the data structure to one of the applications 120 that may handle the event (e.g., perform an action that satisfies a request if the event is a request).

The client/server system 100 includes the client and server systems 102, 104. The client system 102 can interact with a user who interacts with the user interface 108. Interactions with the user interface 108 may generate a user-generated event that is communicated to the user interaction module 110 of the server system 104; however, not all user interaction need result in events that are communicated to the server system 104. The user interface 108 may be a web services application that is viewed in a web browser of the client system 102 or another type of user interface.

The server system 104 includes the user interaction module 110, the context management engine 112, information composition and decision support 118, applications 120, and guided procedures 114. In some implementations additional, fewer, or different components may be included. For example, one or more workflow systems in addition to or instead of the guided procedures 114 may be included. As another example, the server system 104 may include additional components or be incorporated in another system, such that the server system 104 assists many components that implement business processes or other workflow processes. In this fashion, the event resolution may be used to extend functionality of an existing computer-implemented business process.

The user interaction module 110 handles user interaction between the user interface 108 of the client system 102 and the server system 104. In addition to receiving event information from the user interface 108, the user interaction module 110 may send information relating to services to be offered to the user interface 108. In variations, the user interaction module 110 may request information about the context of an event from the user interface 108.

As described above, the context management engine 112 manages context information. The context management engine 112 may modify or generate a data structure in response to receiving an event. Events may be user-generated, as described above, or they may be machine-generated from other sources (e.g., other events 116). For example, an event may be a work order message that is received in response to a work order request from another server system (i.e., a server system other than the server system 104 of FIG. 1).

Events that are received at the context management engine 112 may be related to a business process, such that the events are considered business-driven. For example, a business process may be modeled in a visual modeling tool similar to SAP's VISUAL COMPOSER, such as ZENFLOW. The visual modeling tool may describe the business process in a messaging protocol such as Business Process Execution Language ("BPEL"; e.g., version 1.1), and the server system 104 may follow the computer-implemented business process to provide a service to the user 106. In the example, events may be related to messaging events that relate to the computer-implemented business process, such as receiving a work order, generating an invoice, and the like. The context management engine 112 may receive data characterizing the events and decide how to resolve the events in accordance with the computer-implemented business process. In this way business processes may be dynamically extended with defined procedures or ad hoc end user collaborative practices.

For example, the business process may define that a work order is to be generated in response to receive a payment. The computer-implemented business process may define that, in response to receiving a payment message, a work order message is to be generated. The context management engine 112 may receive data characterizing the receipt of a payment message and generate a data structure that identifies the message. In addition, the context management engine 112 may define how to obtain account information related to the payment (e.g., a bank account number, a bank routing number, and an internet protocol address of a bank processing system) and include that information in the data structure. To assist in resolving the event, the context management engine 112 may further send a request to a work order generation module (e.g., one of the applications 120) with a link to the data structure, and the work order generation module may, in turn, generate the work order. Information that directs the context management engine 112 to send the request to a work order generation module may be included in the data structure (e.g., the data structure may include event resolution information, such as a state diagram or rules to follow), may be part of a guided procedure defined for payments (e.g., the context management engine 112 may reference guided procedures 114 or any other workflow, rule, or recommendation systems to determine how to assist in resolving the event), and the like.

By generating the data structure, the context management engine 112 enables completion of a business process (e.g., generating the work order) and may encapsulate context information (e.g., the information about the event) in the data structure, such that other modules that resolve an event need not find context information themselves. In addition, the data structure may be written in a declarative language such that the data structure is platform-independent and may be easily referenced by components other than the context management engine 112 so those components need not be adapted to platform-dependent data sources to obtain context information and the amount of communication between components may be reduced (e.g., by including information about the event in the data structure).

Information composition and decision support 118 may assist in finding information related to an event that may be included as context information in a data structure corresponding to the event and information that may assist in resolving an event. For example, information from a database of employees may provide context information for a user-generated event from an employee. As another example, the information composition and decision support 118 may infer information from patterns of information (e.g., if a sequence of five payments are received that total over a threshold amount, the information composition and decision support 118 may infer that the sender of the payments is an important entity for which priority of processing should be given). The information and decision support 118 may also support requests for information from data structures that include context data. For example, a request may be made to show events related to certain business objects in a context, and the information and decision support 118 may be able to determine which events relate to one or more business objects. As exemplified above, the information composition and decision support 118 may assist in capturing or inferring information from data structures. For example, an existence of a specific patterns or relationship in the data structures may be calculated. Further, information which would be needed to complete a task may be calculated (e.g., based on a pattern, information that is necessary to complete a pattern such that a business process may be completed may be computed). Information may be obtained or inferred from event-aware work contexts.

Applications 120 represent applications that may be used to assist in resolving an event. For example, the context management engine 112 may send a link to a data structure corresponding to an event to one of the applications 120, which may then use the data structure (e.g., referencing and updating context information in the data structure) to complete a task that responds to the event.

In general, guided procedures 114 may provide a framework to generate, model, and manage workflows. Various backend systems may be accessed by combining different types of services and applications. In designtime, workflows may be generated and modeled. In runtime, different users may have different roles with respective workflows that are guided by, for example, assignment of different tasks, and administrative users may manage and change workflows as desired.

The guided procedures 114 may assist the context management engine 112 in determining a resolution of an event. For example, if a user-generated event received at the context management 112 relates to a guided procedure of a user, the context management engine 112 may determine an event resolution procedure to initiate based on the corresponding guided procedure. For example, if the user 106 submits a reimbursement request through the user interface 108, the context management engine 112 may generate a data structure including information about the reimbursement request and consult the guided procedures 114 to determine that the data structure is to be sent to one of the applications 120 for processing (e.g., to start or continue a business process).

In addition to user-generated events, and data from information composition and support 118, applications 120, guided procedures 114, and user interaction 110, other events 116 may be received by the context management engine 112 and other data sources 122 may be accessed. For example, messaging events may be other events that are received at the context management engine 112. As another example, a database of employee information may be one of the other data sources 122.

Figure 2:
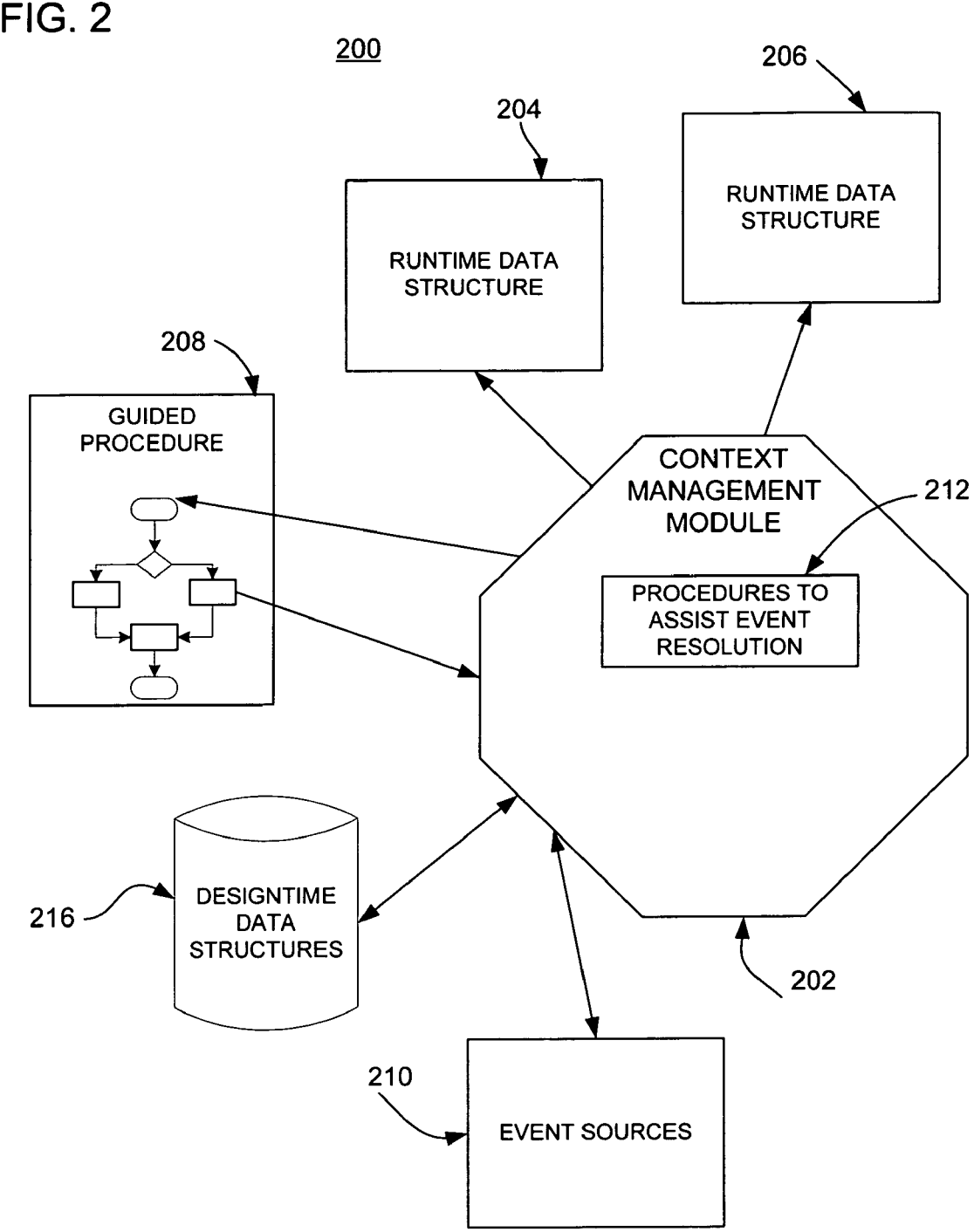
FIG. 2 is a diagram of a context management system.

FIG. 2 is a diagram of a context management system 200. The context management system 200 includes a context management module 202, runtime data structures 204, 206, event sources 210, designtime data structures 216, and a guided procedure 208. In general, the context management system 200 generates data structures 204, 206 that correspond to events and includes information in the data structures 204, 206 that corresponds to information about the corresponding events, which may be referred to as context data. In addition, the context management system may assist in resolving events with the use of the data structures 204, 206, as information related to an event is encapsulated in the data structures. Components of FIG. 2 may be similar to components of FIG. 1. For example, the context management module 202 of FIG. 2 may perform operations similar to that of the context management engine 112 of FIG. 1.

The context management module 202 generates runtime data structures 204, 206 from designtime data structures 216. Each of the runtime data structures 204, 206 may correspond to an event or a sequence of events. For example, a sequence of payments from a customer may have a single corresponding data structure, or multiple corresponding data structures. There may be a type of designtime data structure that corresponds to a type of event. For example, one type of data structure may be a reimbursement data structure and reimbursement events may have a corresponding reimbursement data structure instantiated to include information about a reimbursement request being received as an event.

To generate runtime data structures 204, 206 from designtime data structures 216, the context management module may make a copy of a designtime data structure and populate the copy with information about an event. To do so, the designtime data structures 216 may be defined in accordance with a declarative language, such that compilation is not necessary (e.g., a runtime instance of a data structure may merely be a copy of the designtime data structure). In addition, by being defined in accordance with a declarative language, a runtime data structure may be easily used across different platforms. For example, a runtime data structure may be generated in a JAVA-based platform and MICROSOFT WINDOWS-based applications may easily read the data structure without any transformations of an electronic document including the data structure.

To keep the runtime data structures 204, 206 lightweight or to plan for dynamic composition of data, the data structures 204, 206 may include, in addition to information about an event, information that may be used to find further information about an event. For example, a runtime data structure may include a tag "Employee Database for User" and a link to the event source from which further information about an employee may be found. As another example, a procedure to find further information may be included. For example, a runtime data structure may include a series of tags that correspond to a sequence of actions to find information, such as "employee contact information," "lookup employee name in 'human relations' database to retrieve user identification number," and "employee contact information located in 'contact database' by user identification number," which indicate that with an employee name, the user identification number should be looked-up, from which employee contact information may be found based on a user identification number.

The information that may be used to find further information about an event may be included in a designtime data structure such that the information is included in a runtime data structure, or the context management module 202 may generate the information (e.g., through a protocol generator for generating language in accordance with the protocol used to convey the information). To interpret the information, for example, applications may include a protocol interpreter.

The context management module 202 may assist in resolving events. Event resolution involves determining how to respond to an event, if at all, and, if so, responding to an event. Events, as used in this description, may refer to events that are part of a business process and are implemented in a computer (e.g., an event object). The context management module 202 may assist in resolving events by determining the relevance of an event (e.g., determining which computer-implemented business process corresponds to an event and a portion of the business process to which the event corresponds), generating or updating a data structure to correspond to the event (e.g., one of the runtime data structures 204, 206 may be generated or updated to reflect an event), interpreting a business process to determine whether any action is to be taken, and, if so, following or extending the business process (e.g., through pre-defined actions or ad hoc end user collaborative practices).

For example, an event may be a payment message that is received and an event object may include information about the payment and an identifier for the event. The context management module 202 may determine that the payment message corresponds to a customer intake business process as a determination of the relevance of the event (e.g., identifying the business process as being relevant). The context management module 202 may generate a runtime data structure corresponding to the payment message that includes a time of the payment being received, an amount of the payment, and a reference to the message identifier of the payment message. The context management module 202 may interpret a guided procedure (e.g., the guided procedure 208) corresponding to the business process that indicates that a confirmation is to be generated and a warehouse is to be notified of the payment. Then, the context management module 202 may send the data structure to an application component that generates work orders and to another application component that handles warehouse intake.

In variations, the context management module may associate an event with a runtime data structure and vice versa. For example, an event may be modified to contain an identifier of a corresponding runtime data structure and the runtime data structure may include an identifier of the event (e.g., such that the event may be accessed by an application that uses the data structure to resolve the event). In variations, the context management module may pull data from various data sources to populate a runtime data structure.

The context management module 202 may include procedures to assist in event resolution 212, which may be used to calculate the relevance of an event (e.g., a guided procedure corresponding to an event), interpret guided procedures to determine how to assist in resolving an event, and call an application to resolve an event (e.g., perform a remote function call to an application to process payments). Procedures to assist in event resolution 212 may include procedures based on business rules, state diagrams or processes (e.g., a series of operations to perform).

As multiple events may be received from different sources that exist on different platforms, and the context management module 202 may compute the relevance of an event to a business procedure, the context management module 202 may be used to correlate events from different platforms to a single business process.

In addition to including information about an event in a runtime data structure, key performance indicators may be included in a runtime data structure. The performance indicators may be used to measure one or more qualities of event resolution. For example, a time that an event is received and a time an event was resolved may be kept in each data structure, from which an average event resolution time may be computed across multiple runtime data structures. The performance indicators may be context-specific. For example, the response time for confirming orders may be computed for runtime data structures that represent payment events. Performance indicators may be related to an event resolution procedure that acts on the data structure. For example, survey results of customer satisfaction of goods may be included in a runtime data structure.

A runtime data structure may include ontologies that describe data and information available in the context. For example, a runtime data structure may include a description of relationships of data and data included in the runtime data structure. For example, a runtime data structure may include an ontology that describes a payment runtime data structure includes a thirteen-digit customer number that follows a certain format. Support for ontologies may enable industry-specific descriptions of data. For example, different customer-number formats may be described in different ontologies.

The context management module may infer information from runtime data structures 204, 206. For example, patterns may be defined that define an inference of further data (e.g., a pattern of data may be modeled in a visual modeling tool).

The context management module 202 may use the patterns to determine an existence of the patterns. Similarly, the context management module 202 may infer information based on relationships of data. For example, if a payment data structure and work order completion data structure have been generated and they are related to a same order number, the context management module may infer that the data structures may be archived (e.g., as no further event resolution may be expected). An appearance of patterns may result in event creation.

To assist in coordination of information, a same runtime data structure may be shared by various applications. For example, multiple services may use a same context instance, such that changes to the data structure from one service may be tacitly communicated to other services. In addition, the data structure used by an application may be shared with user interaction. For example, a user may generate an event that causes an update of a data structure that is being worked on by a service.

As the context management module 202 may determine a relevance of an event to a business process, the context management module 202 may manage stateful events. For example, by tracking a progress of a business process, alerts, or tasks.

Event sources 210 may include user and machine-generated events. As examples, event sources 210 may include user interaction from client applications, messages from remote systems, and the like.

In variations a user, such as an administrative user of the context management module 202, may view event resolution during runtime. For example, an overview of a situation in a event resolution procedure may be viewable by a user based on key performance indicators that are interpreted and displayed to a user in a graphical user interface with graphical patterns representing a business process (e.g., a data flow diagram may represent a business process and progress in the business process may be displayed in a data flow diagram).

In variations, a user may be able to collaborate with the context management module 202 to resolve events. For example, web support for an insurance company application may assist a user in adding a car to an insurance policy by changing a business process while the user is adding a car to the policy. For example, if a default business process restricts input of vehicle identification numbers to a sixteen-digit format for newer cars, web support may change the business process to allow thirteen-digit vehicle identification numbers for older vehicles that use such a format.

To assist in resolving events, the context management module 202, in variations, may act as an RSS ("Really Simple Syndication"; e.g., version 2.0) feed server. For example, the context management module 202 may pass events or correlated events on as an RSS feed to RSS clients. This arrangement may enable notification capabilities for business experts. In addition, this arrangement may enable use of standard RSS notification technology for integrating with events. For example, an application that is to resolve an event may receive an RSS feed as a technique for receiving runtime data structures as a representation of the event. Other standards that may be supported for notifications may include, as examples, WS-Notification ("Web Services Notification") and WS-Eventing ("Web Services Eventing").

Figure 3:
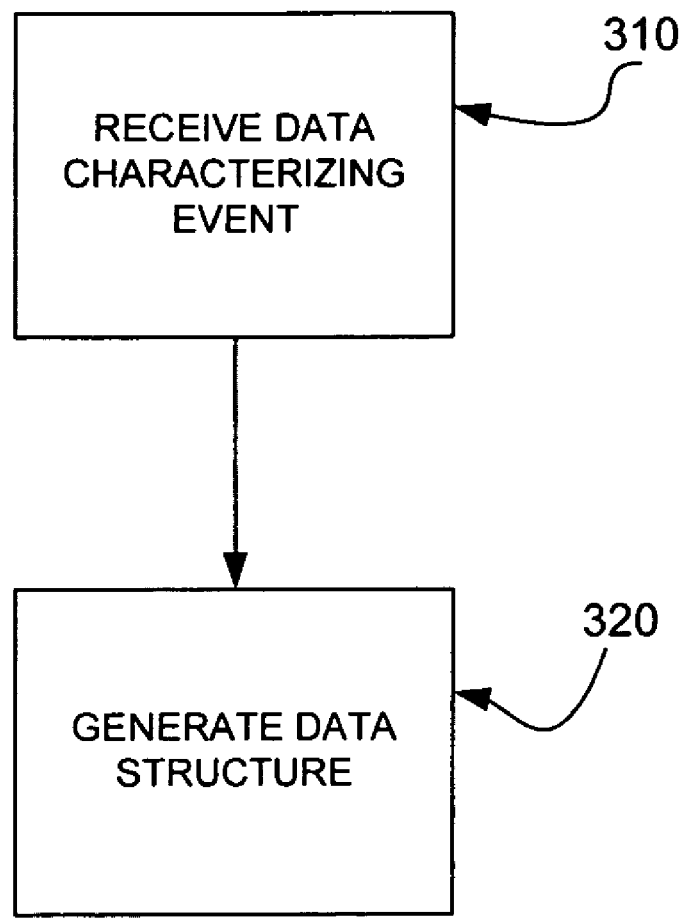
FIG. 3 is a flowchart illustrating a process of generating a data structure.
Figure 4:
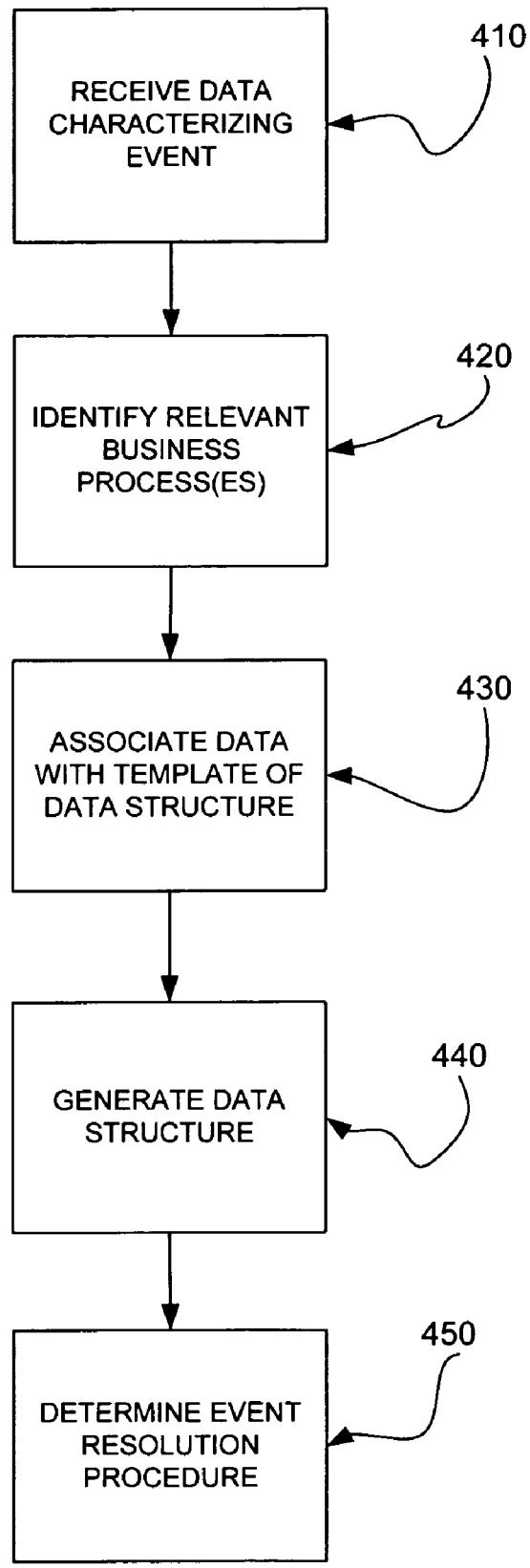
FIG. 4 is a flowchart illustrating a process of assisting resolution of a received event.

FIGS. 3-4 are processes that may be performed by components of the client/server system 100 of FIG. 2 or the context management system 200 of FIG. 2. For example, the context management engine 112 of FIG. 1 or the context management module 202 of FIG. 2 may perform the operations of FIG. 3.

FIG. 3 is a flowchart illustrating a process 300 of generating a data structure. The data structure that is generated may be a runtime data structure that describes information in a declarative format, as described with reference to the runtime data structures 204, 206 of FIG. 2. The data structure may assist in resolving an event by including information about an event in a single source and conveying that information to a system that resolves the event (e.g., a system that is not compatible with the system that generated the event but can interpret the runtime data structure).

Data characterizing an event is received (310). The data characterizing an event may be any type of information, such as an event identifier, a message including information about the event, or the event itself (an event data object that includes various information corresponding to an activity), as well as involved business entities and users. The event may be a user or machine (e.g., computer)-generated event. The event may be a business activity of a business process. For example, the event may be the receipt of a payment in an order processing business process. The event may be related to a business process defined in relation to messaging orchestration (e.g., related to a business process described in accordance with the BPEL specification), or other types of computer-implemented business processes.

By having events related to business processes, event resolution may be focused on resolution of business events, which are separate from technical events (e.g., buffer overflow). Thus, the context of event resolution may differ. This may affect, for example, how event resolution is handled (e.g., by computing relevance of events to business processes and interfacing with enterprise computing systems to resolve events).

A data structure may be generated (320) in response to receiving the data characterizing the event. In general, a data structure may be generated for each event such that there is a one to one correspondence. When an event relates to a sequence of events, the first event may cause the generation of a data structure and later events may cause an updating of the data structure.

The data structure may be a runtime data structure, similar to the runtime data structures 204, 206 of FIG. 2. The data structure may be defined declaratively and easily transportable across various platforms. For example, the data structure may be defined in a tree-structured language similar to eXtensible Markup Language and stored in an electronic document (e.g., a file) that may be read by multiple systems (e.g., stored using an ASCII ("American Standard Code for Information Interchange") encoding format).

The data structure may contain information about an event, information from which information about an event may be obtained, or both. In addition, the data structure may contain information related to performance indicators such that the performance of aspects related to event resolution may be determined. The data structure may also contain an ontology, as discussed with reference to FIG. 2.

The data structure that is generated may be a generic data structure that is generated for all events, the data structure may be a type of data structure that depends on the event received, or some combination of the two techniques. For example, all types of events may result in a data structure being instantiated. As another example, a payment event may result in a payment data structure being generated. As another example, a reimbursement request event may result in a debt data structure being generated (e.g., a type of data structure need not have a one to one correspondence to an event).

FIG. 4 is a flowchart illustrating a process 400 of assisting resolution of a received event. In general, the process may result in a determination of an event resolution procedure for an event. For example, in response to receiving a reimbursement request, a data structure containing information about the reimbursement request may be generated and a system may determine that the data structure is to be forwarded to an accounting system to process the request. Portions of the process 400 may be similar to portions of the process 300 of FIG. 3. For example, the first (410) and fourth (440) activities of the process 400 may be similar to the first (310) and second activities (320) of the process 300 of FIG. 3.

Data characterizing an event is received (410). The data may include information about the event or the event itself.

One or more relevant business processes are identified (420). For example, as a result of computing the relevance of an event (e.g., the event that is received at 410). Computing the relevance of an event may involve determining an association between an event and a business process that may be defined by a business process language, business rules, a guided procedure, or the like. For example, an event may be a smoke detector sensing a presence of smoke and a business rule may relate to smoke detector events. A computing system (e.g., the context management system 200 of FIG. 2) may determine that the event relates to the business rule. To determine the relevance of an event (and, consequently, to identify relevant business processes), a mapping of events to business processes or event resolution procedures may exist. For example, a table having mappings of types of events to business processes (or, particularly, portions of business processes, business rules, or guided procedures). An event may relate to multiple business processes. For example, an emergency event may relate to all business processes, such that all business processes are to halt.

Data is associated with a template of a data structure (430). For example, data characterizing an event may be associated with a data structure corresponding to the type of event (e.g., such that the event is associated with the data structure). Associating the data with a template of a data structure may involve determining a type of data structure (e.g., a designtime data structure that may be used to generate a runtime data structure similar to the data structures 204, 206 of FIG. 2) that corresponds to an event. For example, there may be different types of data structures that correspond to different events. The template may be a designtime version of a runtime data structure. The template may include default values, procedures to assist in resolving an event, information to assist in obtaining information about an event, or other default data.

A data structure is generated (440). The data structure may be the data structure that is associated with the data characterizing the event (e.g., at 430). Generating the data structure may involve generating a copy of a runtime instance of the data structure from a designtime version of the data structure. Generating the data structure may also include populating the data structure with information. Information about the event characterized by the data may be included in the data structure. Information that may be used to find further information about the event may be included (e.g., a procedure to find information about an employee that generated an event may be included in a data structure). Ontologies and performance indicators may be included in the data structure. Business procedures to resolve an event may be included in the data structure. In addition to or instead of performance indicators or ontologies, the data structure may include alerting/notification, resolution procedures, or both. Information in the data structure may be in a format in accordance with a declarative programming language that may be interpreted by other systems (e.g., applications that interpret the data structure to resolve events).

An event resolution procedure may be determined (450). The event resolution procedure may be determined based on the computation of the relevance of an event (420). For example, a business process to be followed may be determined and an activity to perform in accordance with that business process may be determined. The data structure that is generated (at 440) may be used to determine an event resolution procedure. The data structure may be used as part of the event resolution procedure. The data structure may act as a single source for information about an event or sequence of events such that the data structure may be a central reference source to assist in resolving an event. An event resolution procedure may involve calling an application to perform an activity to resolve or assist resolving the event.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although, the subject matter described herein has been described in terms of particular embodiments, other embodiments may be implemented and are within the scope of the following claims. For example, the operations may differ and still achieve desirable results. As another example, although FIGS. 1-2 include a certain combination of components, variations may include different, fewer, or additional components. As another example, the process 400 of FIG. 4 may exclude the activity of associating data with a template of a data structure (430) (e.g., a generic template may always be used). In certain implementations, multitasking and parallel processing may be preferable. Other embodiments are within the scope of the following claims.

What is claimed is:

1. A computer-program product comprising a non-transitory computer-readable media tangibly embodying machine instructions that, when executed by at least one data processing apparatus, cause the at least one data processing apparatus to perform operations comprising:
receiving, from one or more platform-dependent data sources, data characterizing an event for which a resolution is required, the event corresponding to a business activity in one or more computer-implemented business processes, the resolution involving assistance from a plurality of computer-implemented applications each using one of at least two different communications formats;
identifying the one or more business processes as being related to the event, the identifying comprising computing a relevance of the one or more business processes to the event;
generating, at run time using a platform-independent declarative language, a platform-independent data structure in response to receipt of the data characterizing the event, the generating comprising associating the event with a template of the platform independent data structure, and generating the data structure from the template;
storing information in the data structure, the information comprising context information about the event derived from the received data characterizing the event and a business procedure to resolve the event, the context information being stored in the platform-independent data structure in accordance with the platform-independent declarative language;
determining an event resolution procedure to initiate based on the data characterizing the event, the business procedure to resolve the event, and the one or more identified business processes;
initiating the event resolution procedure, the initiating comprising providing access to the platform-independent data structure for the plurality of applications such that the plurality of applications can obtain the context information without being adapted to communicate with the one or more platform-dependent data sources; and
updating the platform-independent data structure to reflect resolution of the event upon receiving a notification of completion of the event resolution procedure.

2. The computer program product of claim 1, wherein the event is a stateful event and the operations further comprise:
associating the event with the platform-independent data structure; and
receiving a notification based on the association of the event with the platform-independent data structure.

3. The computer program product of claim 2, wherein the operations further comprise:
generating the notification of completion of the event resolution procedure.

4. The computer program product of claim 1, wherein determining the event resolution procedure further comprises determining the event resolution procedure based on content of the platform-independent data structure.

5. The computer program product of claim 1, wherein one of the one or more business processes is a rule.

6. The computer program product of claim 1, wherein one of the one or more business processes is a sequence of operations.

7. The computer program product of claim 1, wherein the determining the event resolution procedure further comprises interpreting the one or more business processes to determine an activity to perform.

8. The computer program product of claim 1, wherein the operations further comprise determining the template that corresponds to the event from a plurality of templates.

9. The computer program product of claim 1, wherein the business procedure is a rule.

10. The computer program product of claim 1, wherein the operations further comprise invoking the plurality of applications to resolve the event, the invoking comprising sending data characterizing the data structure to the plurality of applications.

11. The computer-program product of claim 1, wherein the information further comprises at least one of a performance indicator, an alerting procedure, and a notification procedure.

12. A computer-implemented method comprising:
receiving, from one or more platform-dependent data sources, data characterizing an event for which a resolution is required, the event corresponding to a business activity in one or more computer-implemented business processes, the resolution involving assistance from a plurality of computer-implemented applications each using one of at least two different communications formats;
identifying the computer-implemented business processes as being related to the event, the identifying comprising computing a relevance of the one or more business processes to the event;
generating, at run time using a platform-independent declarative language, a platform-independent data structure in response to receipt of the data characterizing the event, the generating comprising associating the event with a template of the platform independent data structure, and generating the data structure from the template;
storing information in the data structure, the information comprising context information about the event derived from the received data characterizing the event and a business procedure to resolve the event, the context information being stored in the platform-independent data structure in accordance with the platform-independent declarative language;
determining an event resolution procedure to initiate based on the data characterizing the event, the business procedure to resolve the event, and the one or more identified business processes;
initiating the event resolution procedure, the initiating comprising providing access to the platform-independent data structure for the plurality of applications such that the plurality of applications can obtain the context information without being adapted to communicate with the on or more platform-dependent data sources; and updating the platform-independent data structure to reflect resolution of the event upon receiving a notification of completion of the event resolution procedure;

wherein the receiving, the identifying, the generating, the storing, the determining, the initiating, and the updating are performed by at least one processor.

13. The method of claim 12, further comprising determining the template that corresponds to the event from a plurality of templates.

14. The method of claim 12, wherein the determining the event resolution procedure comprises interpreting the one or more computer-implemented business processes to determine an activity to perform.

15. The method of claim 12, wherein the information further comprises at least one of a performance indicator, an alerting procedure, and a notification procedure.

16. A system comprising
at least one data processing apparatus;
at least one computer-readable medium embodying machine instructions that, when executed by the at least one data processing apparatus, cause the at least one data processing apparatus to perform operations comprising:

receiving, from one or more platform-dependent data sources, data characterizing an event for which a resolution is required, the event corresponding to a business activity in one or more computer-implemented business processes, the resolution involving assistance from a plurality of computer-implemented applications each using one of at least two different communications formats;

identifying the computer-implemented business processes as being related to the event, the identifying comprising computing a relevance of the one or more business processes to the event;

generating, at run time using a platform-independent declarative language, a platform-independent data structure in response to receipt of the data characterizing the event, the generating comprising associating the event with a template of the platform independent data structure, and generating the data structure from the template;

storing information in the data structure, the information comprising context information about the event derived from the received data characterizing the event and a business procedure to resolve the event, the context information being stored in the platform-independent data structure in accordance with the platform-independent declarative language;

determining an event resolution procedure to initiate based on the data characterizing the event, the business procedure to resolve the event, and the one or more identified business processes;

initiating the event resolution procedure, the initiating comprising providing access to the platform-independent data structure for the plurality of applications such that the plurality of applications can obtain the context information without being adapted to communicate with the one or more platform-dependent data sources; and updating the platform-independent data structure to reflect resolution of the event upon receiving a notification of completion of the event resolution procedure.

17. The system of claim 16, wherein the information further comprises at least one of a performance indicator, an alerting procedure, and a notification procedure.

18. The system of claim 16, wherein the event is a stateful event and the operations further comprise:
associating the event with the data structure; and
receiving a notification based on the association of the event with the data structure.

19. The system of claim 16, wherein determining the event resolution procedure further comprises determining the event resolution procedure based on content of the platform independent data structure.

20. The system of claim 16, wherein the determining the event resolution procedure comprises interpreting the one or more computer-implemented business processes to determine an activity to perform.

* * * * *